United States Patent
Coteus et al.

(10) Patent No.: US 8,358,522 B2
(45) Date of Patent: Jan. 22, 2013

(54) SYNCHRONOUS RECTIFIER GATE DRIVE TIMING TO COMPENSATE FOR TRANSFORMER LEAKAGE INDUCTANCE

(75) Inventors: Paul W. Coteus, Yorktown, NY (US); Andrew Ferencz, Southborough, MA (US)

(73) Assignee: International Business Machines Corporation, Armonk, NY (US)

(*) Notice: Subject to any disclaimer, the term of this patent is extended or adjusted under 35 U.S.C. 154(b) by 365 days.

(21) Appl. No.: 12/836,933

(22) Filed: Jul. 15, 2010

(65) Prior Publication Data

US 2012/0013369 A1  Jan. 19, 2012

(51) Int. Cl.
*H02M 5/42* (2006.01)
(52) U.S. Cl. .......................... 363/89; 363/127
(58) Field of Classification Search .................. 363/89, 363/127, 21.06, 21.14
See application file for complete search history.

(56) References Cited

U.S. PATENT DOCUMENTS

| | | | |
|---|---|---|---|
| 6,243,275 B1 | 6/2001 | Ferencz | 363/17 |
| 6,426,884 B1 | 7/2002 | Sun | 363/17 |
| 6,621,236 B1 * | 9/2003 | Kisaichi | 315/224 |
| 6,861,826 B2 | 3/2005 | Lynch | 323/224 |
| 6,961,256 B2 | 11/2005 | Yang | 363/127 |
| 7,589,982 B2 | 9/2009 | Wang et al. | 363/21.06 |
| 7,656,684 B2 | 2/2010 | Lipcsei et al. | 363/17 |
| 7,688,602 B2 | 3/2010 | Hu | 363/21.14 |

OTHER PUBLICATIONS

"Ultra High Efficiency DC-DC Controller", O₂Micro, Jul. 2008, 7 pgs.

* cited by examiner

*Primary Examiner* — Shawn Riley
(74) *Attorney, Agent, or Firm* — Harrington & Smith; Louis J. Percello

(57) ABSTRACT

An apparatus for providing synchronous rectifier gate drive timing is described. The apparatus includes circuitry to receive a first signal. The apparatus also includes circuitry to generate a second signal by modifying the first signal to delay a transition from high to low for a non-zero overlap duration. An output to apply an inverse of the first signal as a gate drive timing of at least a first transistor and to apply the second signal as a gate drive timing of at least a second transistor, where the first transistor is a part of a primary side of a full-bridge synchronous rectifier and the second transistor is a part of a secondary side of the full-bridge synchronous rectifier is also included. The second signal and the inverse of the first signal are high during the overlap duration. Methods and program storage devices are also disclosed.

19 Claims, 10 Drawing Sheets

SECONDARY SIDE FULL BRIDGE SYNCHRONOUS RECTIFIES TOPOLOGY
CURRENT FLOWS THROUGH TWO SERIES CONNECTED DEVICES

SECONDARY SIDE FULL BRIDGE SYNCHRONOUS RECTIFIES TOPOLOGY
CURRENT FLOWS THROUGH TWO SERIES CONNECTED DEVICES

CONVENTIONAL LOW OUTPUT VOLTATE SYNCHRONOUS RECTIFIER
TOPOLOGY CURRENT FLOWS THROUGH ONE MOSFET

US 8,358,522 B2

SYNCHRONOUS RECTIFIER GATE DRIVE TIMING TO COMPENSATE FOR TRANSFORMER LEAKAGE INDUCTANCE

TECHNICAL FIELD

The exemplary embodiments of this invention relate generally to synchronous rectifier dc/dc converter power train and, more specifically, relate to synchronous rectifier gate drive timing to compensate for commutation time due to transformer leakage inductance.

BACKGROUND

Synchronous rectifier may be used in a large verity of electronic devices. These rectifiers may be used to convert a direct current (DC) from a first voltage to another voltage. Such rectifiers may also include various components, for example, transformers, to provide galvanic isolation. Careful timing of the rectifier may be used to reduce loss of energy in increase efficiency.

An example of a synchronous rectifier is one where transistors (e.g., MOSFETs) are used to create an H-bridge. This configuration may have four transistors forming a 'full-bridge' or two transistors forming a half-bridge.

The MOSFETs may be controlled by fixed delays and logic that create a time period when the current is forced to conduct through the body diode of the MOSFET. As the voltage across a diode is significantly larger than the MOSFET on resistance multiplied by the load current, a higher energy loss per switching cycle results in lower efficiency.

FIG. 1 illustrates a simplified block diagram of an electronic device having a secondary side 'full-bridge' synchronous rectifier topology where current flows through two series connected devices. In a particular application requiring the dc/dc converter to sustain a single failure of a semiconductor device without interrupting the output voltage bus, the output MOSFETs may be configured as a 'full-bridge' (see FIG. 1) where the transistors are activated in pairs (e.g., Q1-Q3 pair and Q2-Q4 pair). In this example, these pairs are activated using the DOT and NO_DOT signals.

FIG. 2 illustrates a simplified block diagram of an electronic device having a conventional low output voltage synchronous rectifier topology where current flow through one MOSFET. In this 'half-bridge' rectifier (see FIG. 2), only two MOSFETs (Q1 and Q2) are in parallel. Compared to a 'half-bridge' rectifier the energy loss of a 'full-bridge' rectifier is doubled because the current must flow through two devices in series (Q2 and Q4 when DOT is activated or Q1 and Q3 when NO_DOT is activated).

Common methods of timing synchronous rectifier for 'full-bridge' and 'half-bridge' output stages use complementary drive signals from the primary MOSFET drive signals. FIG. 5 illustrates a simplified block diagram of an electronic device having a conventional gate drive timing for a 'full-bridge' primary with a secondary synchronous rectifiers (no zero voltage switching on primary possible). In the 'full-bridge' configuration some time may be spent with all primary switches off (dead time) resulting in zero volts across the primary winding. The secondary side output inductor then forces current to flow through all secondary side switches. A preferred loss would be for all secondary switches to be 'on'. Thus, a gate drive method is to provide complementary signals where one pair of primary side MOSFETs is labeled A and the other B and the secondary side gate drive is driven NOT_A and NOT_B such that the polarity of the windings is correct for power delivery as shown in FIG. 5.

FIG. 6 illustrates a simplified block diagram of an electronic device using an alternate method to achieve phase-shifted gate drive timing for a 'full-bridge' primary with secondary synchronous rectifiers (non-optimal). The two typical primary switching strategies are to 1) turn both primary switches off to create the pulse wave modulated (PWM) voltage across the primary or 2) to turn two switches on that force the winding to 'zero volts'. For the second method of clamping the primary to zero voltage either both top or bottom switches can be turned on. Two standard methods to accomplish the clamping are the 'phase shifted lull-bridge' control method where the left and right bridge are driven by a 50% duty-cycle and a phase angle determined by the PWM voltage or an alternative which provides complementary drive signals to the left and right legs of the bridge as shown in FIG. 6. Both methods result in the same voltage and current waveforms imposed on the transformer but the latter is more robust and easier to implement.

When either NOT_A and NOT_B are changed from being high to either A or B being high, the current must change polarity in the windings. During this transition a period of time exists when the current remains in the polarity of the previous state before 'crossing zero' (see FIG. 3 which depicts a flowchart illustrating a conventional timing approach). Using the typical gate drive techniques, one secondary leg of the output MOSFETs would be turned off before the current crosses zero. A MOSFET has a 'body diode' which protects the switch from a large energy pulse (the current cannot instantly stop flowing without a large dissipation of energy) but results in the current moving from the low resistance MOSFET channel to the body diode.

This commutation time, or delay, results in several issues. One issue is that the delay causes a period of time when the current flows through the 'body diode' of the MOSFET reducing the power delivery efficiency. The body diode also exhibits charge storage resulting in additional energy loss, called 'reverse recovery current' or 'recovery charge'. For low voltage outputs the percentage of additional power losses rises since the diode drop is a fixed voltage as compared to the variable output voltage. Thus, a typical 0.8 V diode drop is more significant to a 1 V output regulator than to a 5 V regulator output. The reverse recovery process by which charge needs to be removed from the body diode results in the MOSFET appearing to have a large capacitance which increases the turn off spike and results in potentially harmful stress to the MOSFET and additional power loss.

This problem is compounded with a 'full-bridge' output rectification as two diodes are present in series. What is needed is a synchronous rectifier configuration which is functional in low voltage outputs, improves the reliability of the circuit and prevents single faults from disturbing the power bus.

BRIEF SUMMARY

An exemplary aspect in accordance with this invention is an apparatus for providing synchronous rectifier gate drive timing to compensate for commutation time due to transformer leakage inductance. The apparatus includes receiving circuitry configured to receive a first signal. The apparatus also includes processing circuitry configured to generate a second signal by modifying the first signal to delay a transition from high to low for a non-zero overlap duration. Output circuitry configured to apply an inverse of the first signal as a gate drive timing of at least a first transistor, the first transistor is a part of a primary side of a full-bridge synchronous rectifier and to apply the second signal as a gate drive timing of at least a second transistor, the second transistor is a part of a secondary side of the full-bridge synchronous rectifier is also included. The second signal and the inverse of the first signal are high during the overlap duration.

A further exemplary aspect in accordance with this invention is a program storage device for providing synchronous rectifier gate drive timing to compensate for commutation time due to transformer leakage inductance. The program storage device is readable by a machine (for example, a computer) and is tangibly embodying a program of instructions executable by the machine for performing operations. The operations include receiving a first signal; generating a second signal by modifying the first signal to delay a transition from high to low for a non-zero overlap duration; and applying an inverse of the first signal as a gate drive timing of at least a first transistor, the first transistor is a part of a primary side of a full-bridge synchronous rectifier, applying the second signal as a gate drive timing of at least a second transistor, the second transistor is a part of a secondary side of the full-bridge synchronous rectifier. The second signal and the inverse of the first signal are high during the overlap duration.

An additional exemplary aspect in accordance with this invention is a method for providing synchronous rectifier gate drive timing to compensate for commutation time due to transformer leakage inductance. The method includes receiving a first signal and generating a second signal by modifying the first signal to delay a transition from high to low for a non-zero overlap duration. The method also includes applying an inverse of the first signal as a gate drive timing of at least a first transistor, the first transistor is a part of a primary side of a full-bridge synchronous rectifier, and applying the second signal as a gate drive timing of at least a second transistor, the second transistor is a part of a secondary side of the full-bridge synchronous rectifier. The second signal and the inverse of the first signal are high during the overlap duration.

BRIEF DESCRIPTION OF THE SEVERAL VIEWS OF THE DRAWINGS

The foregoing and other aspects of embodiments of this invention are made more evident in the following Detailed Description, when read in conjunction with the attached Drawing Figures, wherein.

DETAILED DESCRIPTION

Figure 1:
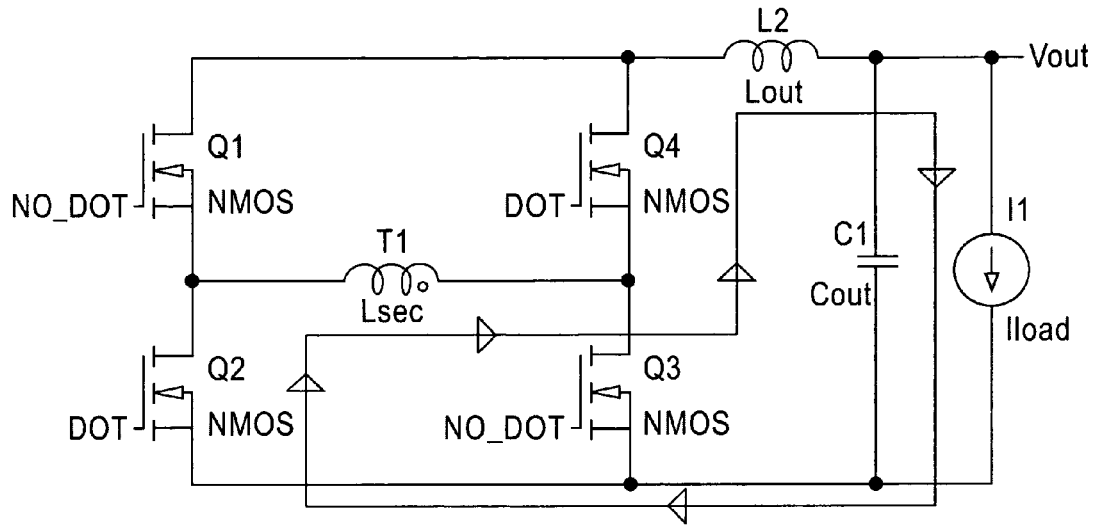
FIG. 1 illustrates a simplified block diagram of an electronic device having a secondary side 'full-bridge' synchronous rectifier topology where current flows through two series connected devices.
Figure 2:
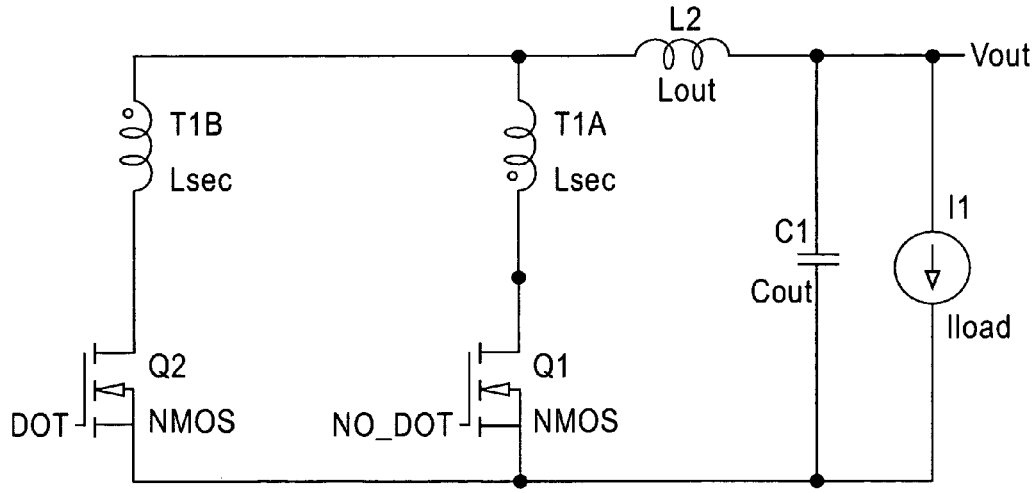
FIG. 2 illustrates a simplified block diagram of an electronic device having a conventional low output voltage synchronous rectifier topology where current flow through one MOSFET.
Figure 3:
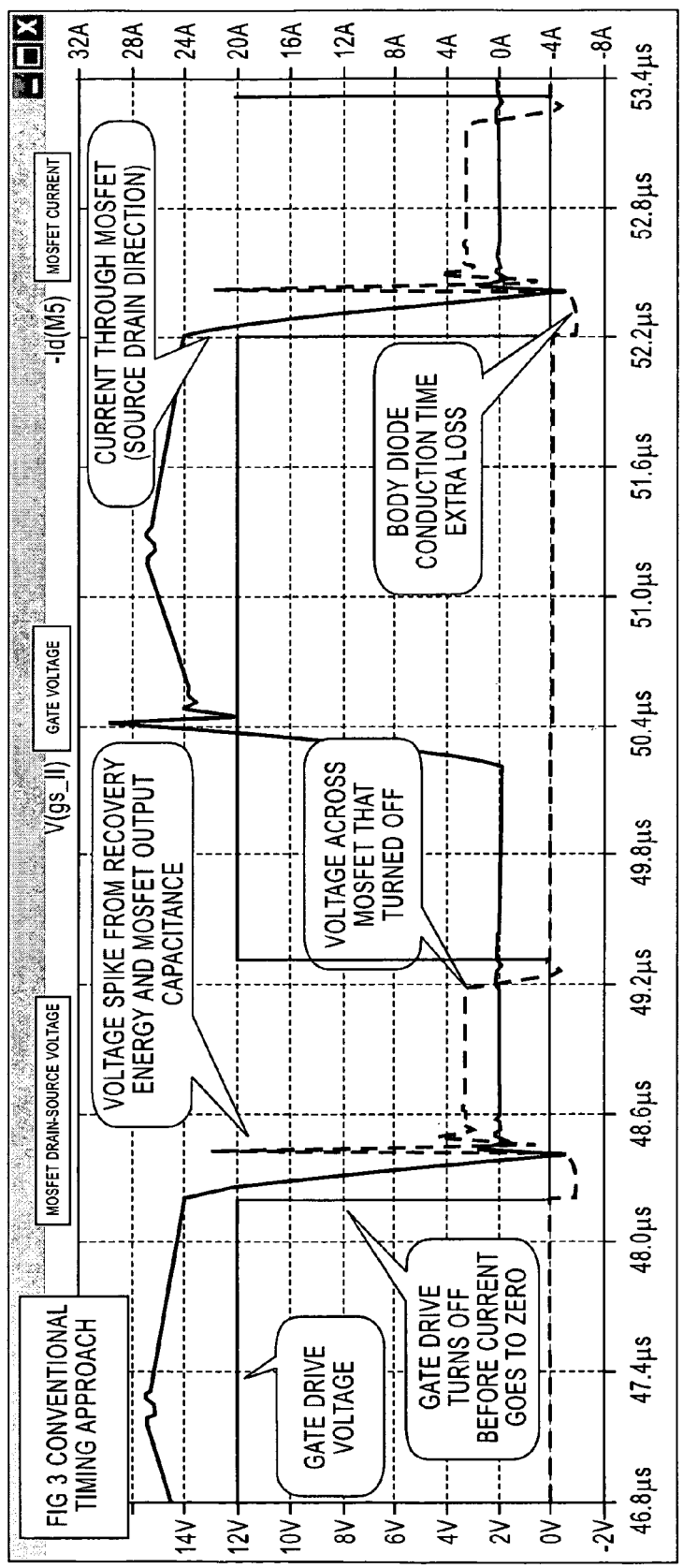
FIG. 3 depicts a flowchart illustrating a conventional timing approach.

Various exemplary embodiments in accordance with this invention add a delay during transitions from ON to OFF in the 'full-bridge' output configuration. This delay is proportional to the load current such and depends on the construction of the transformer and the amount of leakage flux. The resulting synchronous rectifier configuration is functional in low voltage outputs, improves the reliability of the circuit and prevents single faults from disturbing the power bus.

Using various exemplary embodiments, it is possible to integrate redundant power into a power train architecture without external protection circuitry and to reduce the losses associated with body diode conduction. Exemplary embodiments in accordance with invention solve at least two problems: 1) combining a redundant output switch configuration for use in a redundant configuration (e.g., the 'full-bridge' configuration) and 2) optimum timing to reduce the losses associated with current commutation and conduction in the body diode. This also beneficially reduces the recovery energy and peak voltage ring across the MOSFET.

Various exemplary embodiments in accordance with this invention reduce the power loss of a redundant synchronous DC-DC power converter, while using a design that is generally thought of as having more loss than current practice—a 'full-bridge' configuration. The 'full-bridge' output stage has two lateral FETs between power and ground, rather than the generally perceived more power efficient 'half-bridge' output stage with the loss of just a single lateral power FET. The 'full-bridge' enables achieving the protection against output short and eliminating lossy OR-ing FETs in the 'half-bridge' design.

Focusing on the loss of two FETs it is possible to determine the nature of the loss and to eliminate it with subtle output current dependent timing shifts in the gate enable signals.

The output MOSFET's timing may be derived as the inverse of the primary MOSFET's timing while taking into account the polarity of the windings. An additional delay before turning off a secondary MOSFET may be used to compensate for the leakage inductance of the transformer which causes a finite slope in the transformer current. The slope may be determined based on the voltage applied across the winding, the time may be calculated from the initial to final value and the slope.

A simple circuit may be used to capture the current and driving voltage at the moment of switching to add first order compensation to improve the efficiency. These improvements are critical at lower output voltages because the diode voltage, which may be fixed to be about 0.8-1.0 V may become a more significant contributor to efficiency as the output voltage drops. For a 'full-bridge' output, which enhances reliability by adding a redundant switch, the loss may be due to two output diodes so proper timing is important.

One additional factor that may be accounted for when determining the timing shifts is the value of the output inductor. If the inductor is small (having a low value) since all four MOSFET carry current and the voltage is near zero, the inductor current will decrease. Thus, the intersection value for the inductor current and transformer current (the time to turn off one half of the output bridge) may be sooner.

Figure 4:
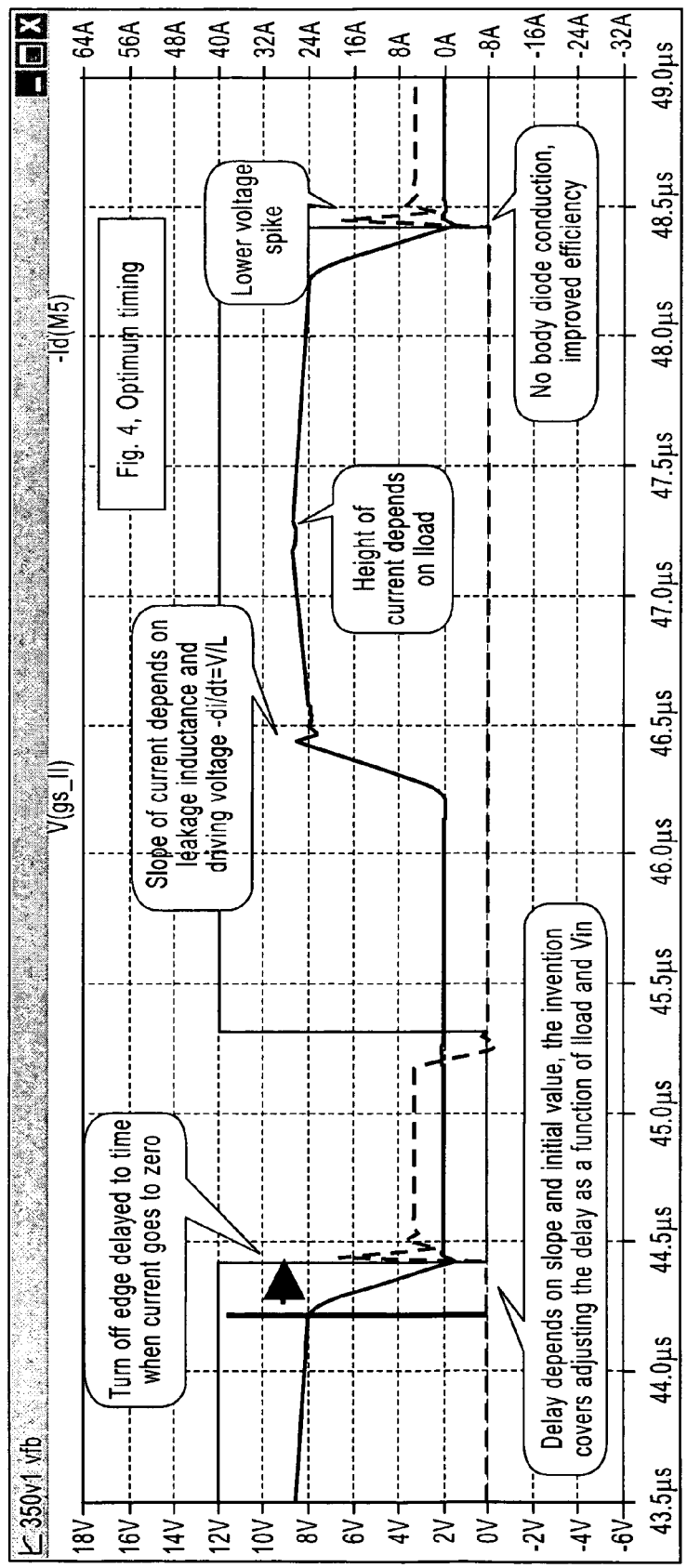
FIG. 4 depicts a flowchart illustrating one non-limiting example of an optimum timing in accordance with an exemplary embodiment of this invention.

FIG. 4 depicts a flowchart illustrating one non-limiting example of an optimum timing in accordance with an exemplary embodiment of this invention. As shown, the turn off edge is delayed to a point where the current goes to zero. This delay may depend on the slop an initial value of the current. The use of such timing techniques generate a lower voltage spike then the convention methods.

Figure 7:
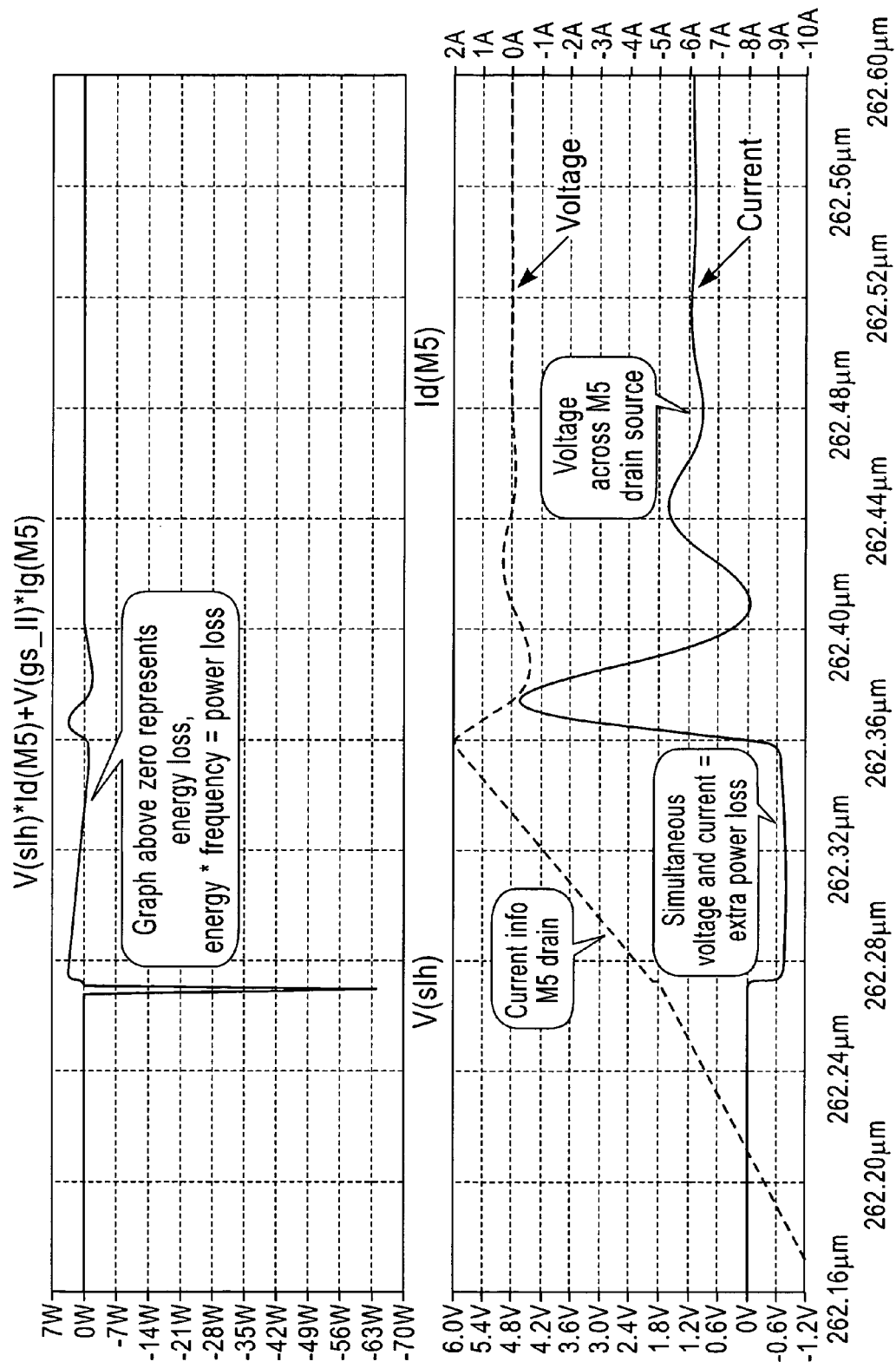
FIG. 7 illustrates an instantaneous power loss in one MOSFET (of several in parallel) which are using a conventional timing technique.

FIG. 7 illustrates an instantaneous power loss in one MOSFET (of several in parallel) which are using a conventional timing technique. The top graph shows the energy. The bottom graph shows the voltage and current. In the energy graph, a positive value indicates energy loss. As shown, the energy loss coincides with the change in voltage.

Figure 8:
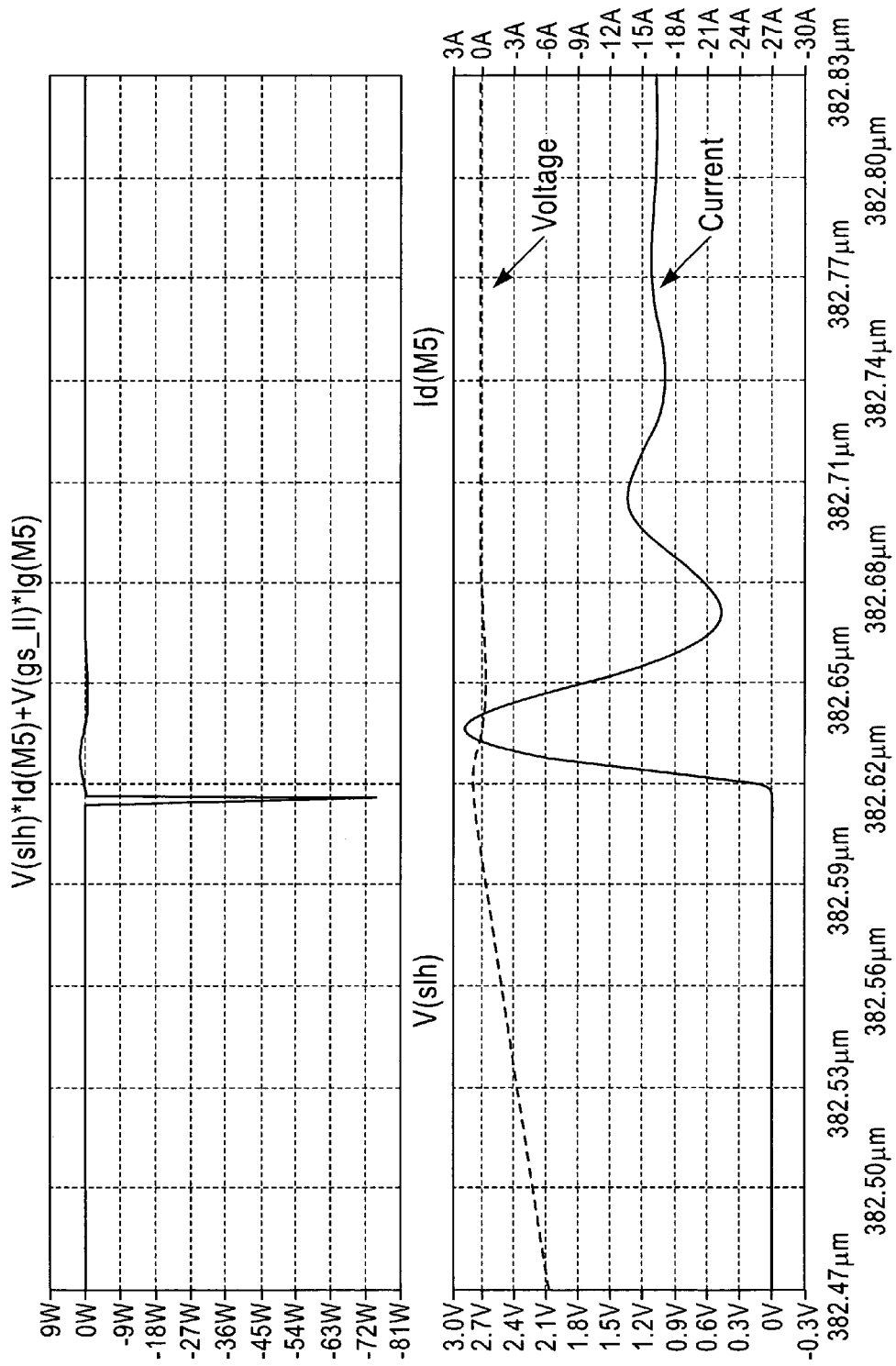
FIG. 8 illustrates an instantaneous power loss in one MOSFET (of several in parallel) which are using an optimum timing technique in accordance with an exemplary embodiment of this invention.

FIG. 8 illustrates an instantaneous power loss in one MOSFET (of several in parallel) which are using an optimum timing technique in accordance with an exemplary embodiment of this invention. In contrast to that in FIG. 7, the transition is more efficient resulting in less energy loss.

Figure 9:
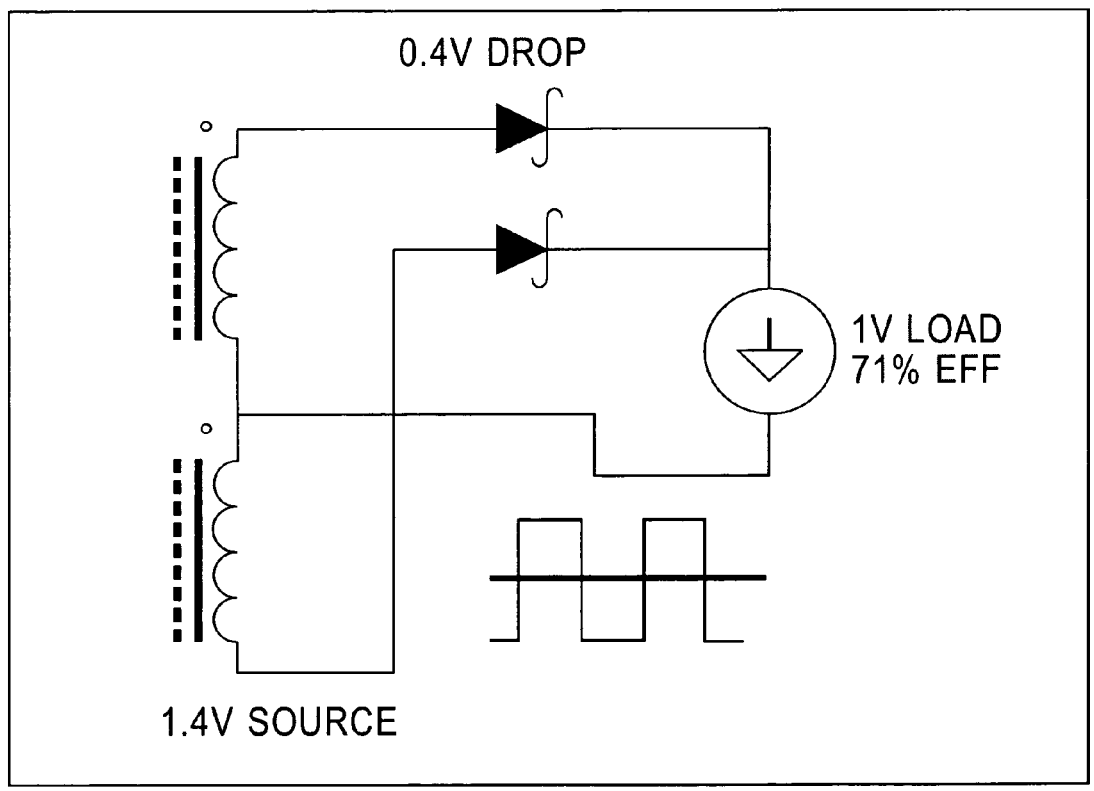
FIG. 9 illustrates a sample efficiency for a synchronous rectifier.

FIG. 9 illustrates an exemplary synchronous rectifier. As shown, the circuit has a 1.4 V source. The loss of 0.4 V across the diode results in 71% efficiency. In prior circuits, where the source voltage was higher, a similar loss of 0.4 V would not affect efficiency to such a degree. Accordingly, circuits using low source voltages lose a greater degree of efficiency using the conventional techniques.

Figure 10:
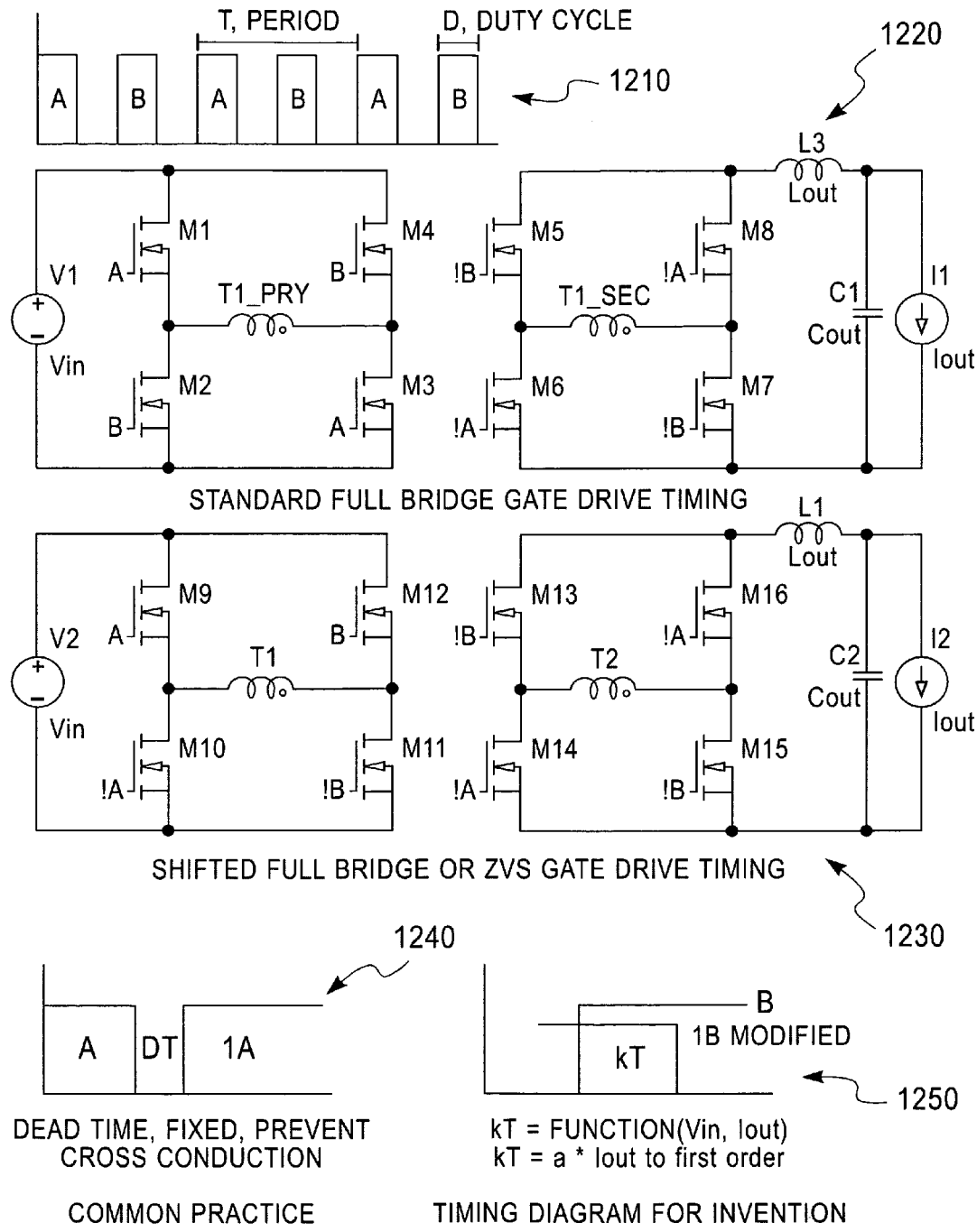
FIG. 10 illustrates a simplified block diagram of an electronic device having a standard 'full-bridge' gate drive timing and shifted 'full-bridge' or ZVS gate drive timing.

FIG. 10 illustrates a simplified block diagram of an electronic device having a standard 'full-bridge' gate drive timing and shifted 'full-bridge' or ZVS gate drive timing. Graph 1210 shows information regarding the A and B signals. T is the period for the A signal and D is the duty cycle for the B signal (e.g., the length of time that B is high). As shown, signals A and B are similar but phase-shifted.

Figure 5:
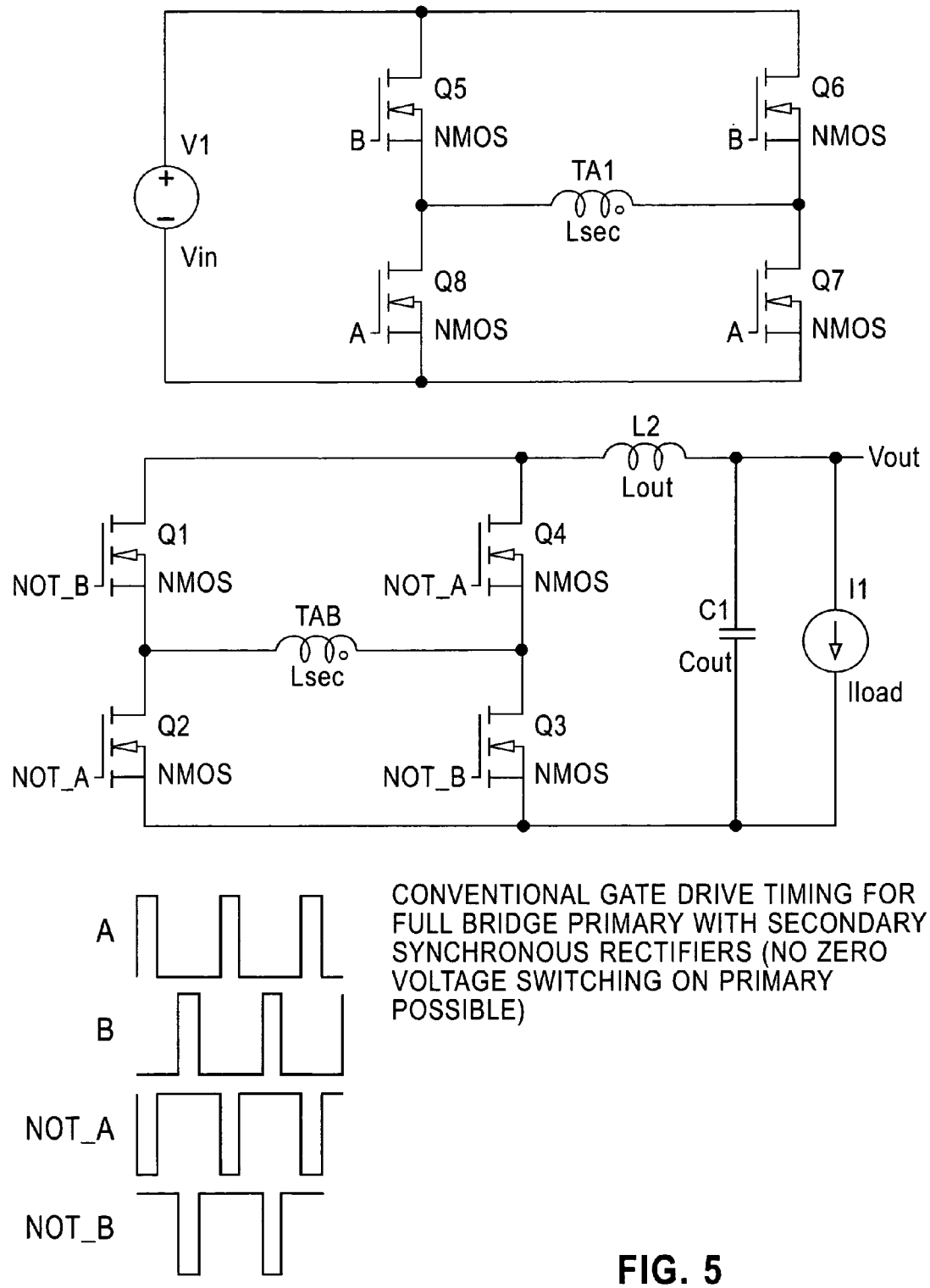
FIG. 5 illustrates a simplified block diagram of an electronic device having a conventional gate drive timing for a 'full-bridge' primary with a secondary synchronous rectifiers (no zero voltage switching on primary possible)

Circuit 1220 shows a standard full-bridge gate time similar to that of FIG. 5. On the primary side, signal A is applied to transistors M1 and M3 while signal B is applied to transistors M4 and M2. On the secondary side, signal !A (i.e., not A) is applied to M6 and M8 while signal !B is applied to transistors M5 and M7.

Figure 6:
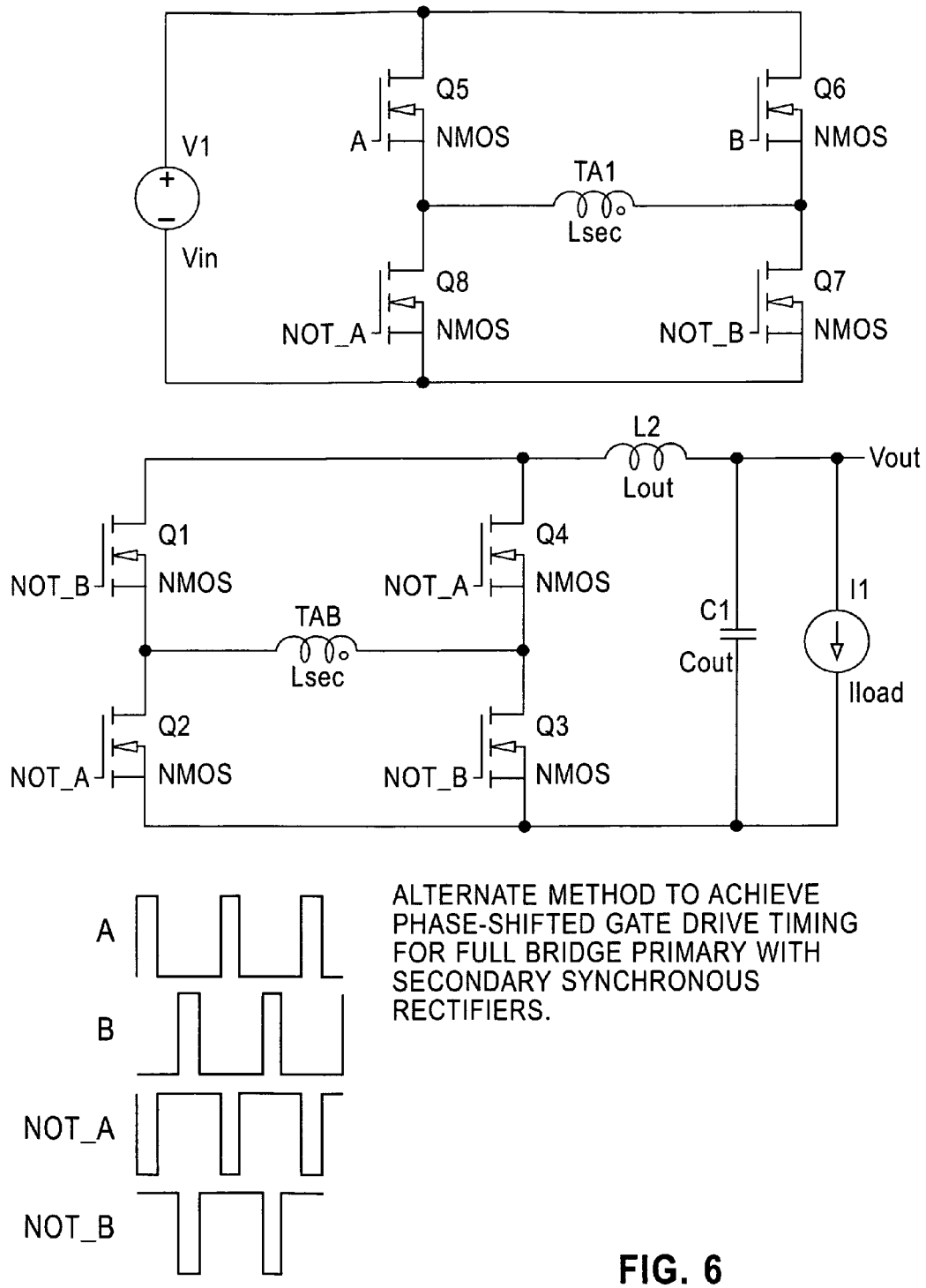
FIG. 6 illustrates a simplified block diagram of an electronic device using an alternate method to achieve phase-shifted gate drive timing for a 'full-bridge' primary with a secondary synchronous rectifiers (non-optimal)

Circuit 1230 shows a shifted full-bridge gate time similar to that of FIG. 6. On the primary side, signal A is applied to transistors M9 and !A is applied to M10 while signal B is applied to transistors M12 and !B is applied to M11. On the secondary side, signal !A is applied to M14 and M16 while signal !B is applied to transistors M13 and M15.

Graph 1240 shows a timing diagram for the common practice of providing a dead time (for duration DT) between transitions of the A signal and !A signal, such that both A and !A have a low value during DT.

Graph 1250 shows a timing diagram for an exemplary embodiment in accordance with this invention. As shown, the modified !B is delayed for duration kT such that the modified !B signal and the B signal overlap. Duration kT may be calculated based on a measured current in the secondary side (for example, readings Iout from current meter I2), a measured supply voltage on the primary side (for example, Vin supplied from voltage source V2.

The modified !B signal is shown to have a lower 'high' signal than B signal to further demonstrate the two signals overlapping. In practice these signals may have the same high values.

In an exemplary embodiment in accordance with this invention, the modified !B signal may be applied to the secondary side, while the !B signal on the primary side does not feature the overlap duration. The !B signal on the primary side may even implement a deadtime technique. In an further exemplary embodiment in accordance with this invention, both the !A and !B signals may be similarly modified.

Figure 12:
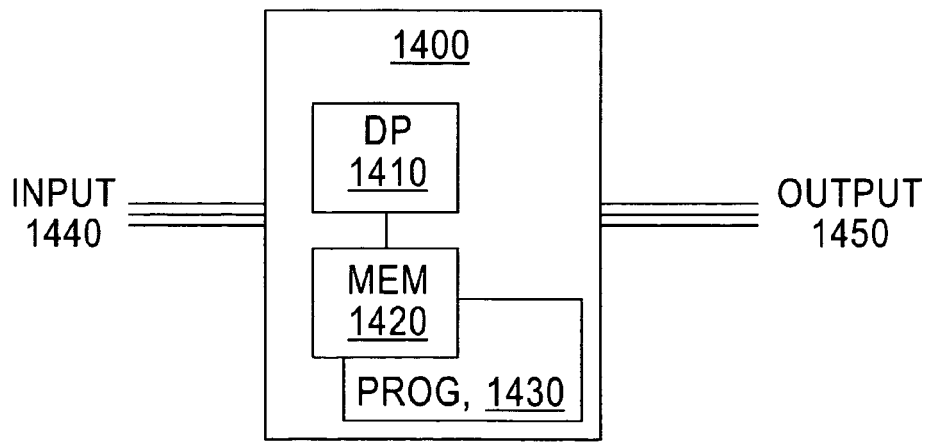
FIG. 12 illustrates a simplified block diagram of an electronic device in accordance with various exemplary embodiments of this invention.

FIG. 12 illustrates a simplified block diagram of an electronic device in accordance with various exemplary embodiments of this invention. The apparatus 1400 includes a processing unit, such as processing circuitry, a computer or a data processor (DP) 1400, a computer-readable memory medium embodied as a memory (MEM) 1420 that stores a program of computer instructions (PROG) 1430. The DP 1410 receives at least one input 1440 (for example, a measure of an input voltage and in output current for a synchronous rectifier) and, based on the PROG 1430, generates at least one output 1450 in order to control the operation of the synchronous rectifier (for example, gate drive signals A, B, not A (!A) and not B (!B)).

The exemplary embodiments of this invention may be carried out by computer software implemented by the DP 1410 or by hardware, or by a combination of hardware and software. As a non-limiting example, the exemplary embodiments of this invention may be implemented by one or more integrated circuits. The MEM 1420 may be of any type appropriate to the technical environment and may be implemented using any appropriate data storage technology, such as optical memory devices, magnetic memory devices, semiconductor based memory devices, fixed memory and removable memory, as non-limiting examples. The DP 1410 may be of any type appropriate to the technical environment, and may encompass one or more of microprocessors, general purpose computers, special purpose computers and processors based on a multi-core architecture, as non limiting examples.

Below are further descriptions of various non-limiting, exemplary embodiments of the invention. The below-described exemplary embodiments are numbered separately for clarity purposes. This numbering should not be construed as entirely separating the various exemplary embodiments since aspects of one or more exemplary embodiments may be practiced in conjunction with one or more other aspects or exemplary embodiments.

The exemplary embodiments of the invention, as discussed herein and as particularly described with respect to exemplary methods, may be implemented in conjunction with a program storage device (e.g., at least one memory) readable by a machine, tangibly embodying a program of instructions (e.g., a program or computer program) executable by the machine for performing operations. The operations comprise steps of utilizing the exemplary embodiments or steps of the method.

Figure 11:
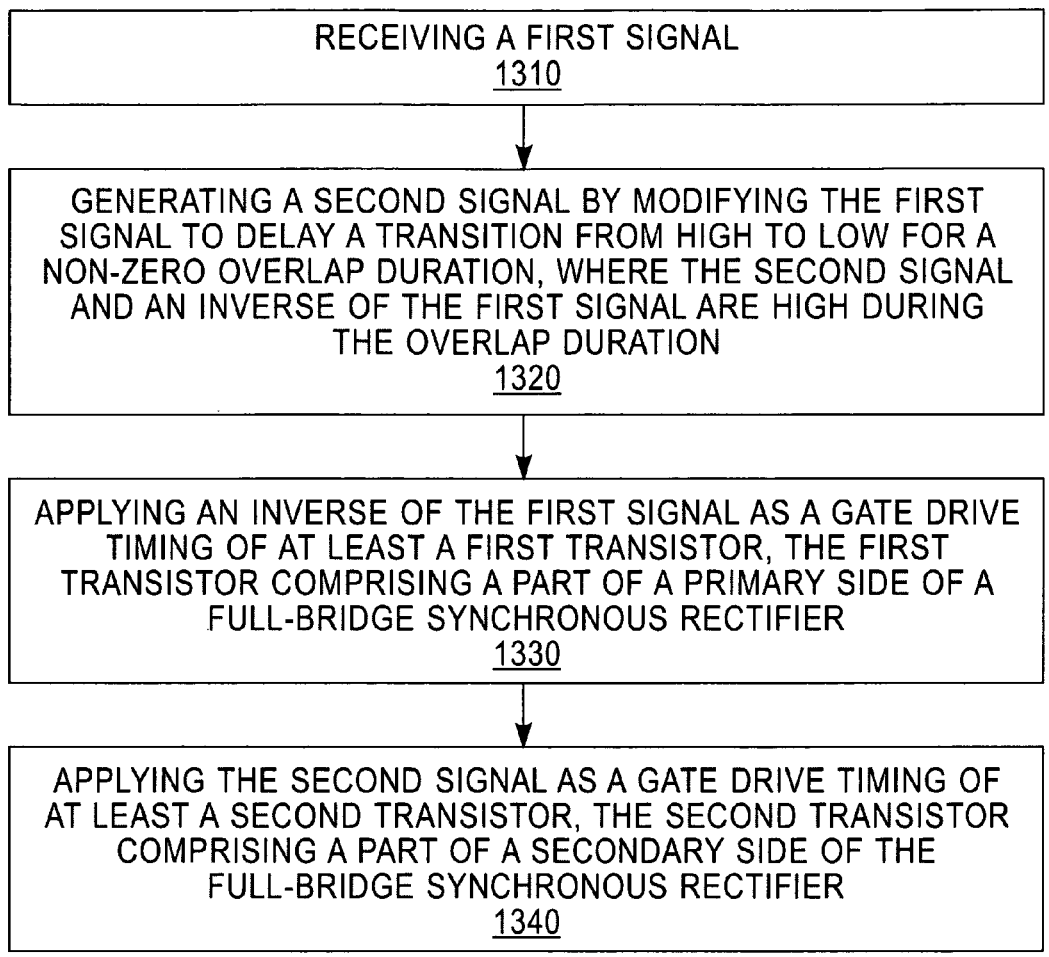
FIG. 11 is a logic flow diagram that illustrates the operation of an exemplary method, and a result of execution of computer program instructions embodied on a computer readable memory, in accordance with various exemplary embodiments of this invention.

FIG. 11 is a logic flow diagram that illustrates the operation of a method, and a result of execution of computer program instructions, in accordance with the exemplary embodiments of this invention. In accordance with these exemplary embodiments a method performs, at Block 1310, a step of receiving a first signal is shown. Generating a second signal by modifying the first signal to delay a transition from high to low for a non-zero overlap duration, where the second signal and the inverse of the first signal are high during the overlap duration is shown at Black 1320. At Block 1330, a step of applying an inverse of the first signal as a gate drive timing of at least a first transistor, the first transistor comprising a part of a primary side of a full-bridge synchronous rectifier is shown. Applying the second signal as a gate drive timing of at least a second transistor, the second transistor comprising a part of a secondary side of the full-bridge synchronous rectifier is shown at Black 1340

The various blocks shown in FIG. 11 may be viewed as method steps, and/or as operations that result from operation of computer program code, and/or as a plurality of coupled logic circuit elements constructed to carry out the associated function(s).

The blocks shown in FIG. 11 further may be considered to correspond to one or more functions and/or operations that are performed by one or more components, circuits, chips, apparatus, processors, computer programs and/or function blocks. Any and/or all of the above may be implemented in any practicable solution or arrangement that enables operation in accordance with the exemplary embodiments of the invention as described herein.

In addition, the arrangement of the blocks depicted in FIG. 11 should be considered merely exemplary and non-limiting. It should be appreciated that the blocks shown in FIG. 11 may correspond to one or more functions and/or operations that may be performed in any order (e.g., any suitable, practicable and/or feasible order) and/or concurrently (e.g., as suitable, practicable and/or feasible) so as to implement one or more of the exemplary embodiments of the invention. In addition, one or more additional functions, operations and/or steps may be utilized in conjunction with those shown in FIG. 11 so as to implement one or more further exemplary embodiments of the invention.

That is, the exemplary embodiments of the invention shown in FIG. 12 may be utilized, implemented or practiced in conjunction with one or more further aspects in any combination (e.g., any combination that is suitable, practicable and/or feasible) and are not limited only to the steps, blocks, operations and/or functions shown in FIG. 12.

An exemplary embodiment in accordance with this invention is an apparatus for providing synchronous rectifier gate drive timing to compensate for commutation time due to transformer leakage inductance. The apparatus includes receiving circuitry configured to receive a first signal. The apparatus also includes processing circuitry configured to generate a second signal by modifying the first signal to delay a transition from high to low for a non-zero overlap duration. Output circuitry configured to apply an inverse of the first signal as a gate drive timing of at least a first transistor, the first transistor is a part of a primary side of a full-bridge synchronous rectifier and to apply the second signal as a gate drive timing of at least a second transistor, the second transistor is a part of a secondary side of the full-bridge synchronous rectifier is also included. The second signal and the inverse of the first signal are high during the overlap duration.

In a further exemplary embodiment of the apparatus above, the receiving circuitry is also configured to receive a third signal. The processing circuitry is also configured to generate a fourth signal by modifying the third signal to delay a transition from high to low for the non-zero duration. The output circuitry is also configured: to apply an inverse of the third signal as a gate drive timing of at least a third transistor, the third transistor is a part of the primary side of the full-bridge synchronous rectifier, and to apply the fourth signal as a gate drive timing of at least a fourth transistor, the fourth transistor is a part of the secondary side of the full-bridge synchronous rectifier. The fourth signal and the inverse of the third signal are high during the overlap duration.

In an additional exemplary embodiment of any one of the apparatus above, the output circuitry is also configured: to apply the first signal as a gate drive timing of at least a fifth transistor, the fifth transistor is a part of the primary side of the full-bridge synchronous rectifier, and to apply the third signal as a gate drive timing of at least a sixth transistor, the sixth transistor is a part of the primary side of the full-bridge synchronous rectifier.

In a further exemplary embodiment of any one of the apparatus above, the output circuitry is also configured to apply the second signal as a gate drive timing of at least a seventh transistor, the seventh transistor is a part of the secondary side of the full-bridge synchronous rectifier, and to apply the fourth signal as a gate drive timing of at least an eighth transistor, the eighth transistor is a part of the secondary side of the full-bridge synchronous rectifier.

In an additional exemplary embodiment of any one of the apparatus above, the processing circuitry is also configured to determine the overlap duration based at least in part on an output current of the secondary side of the full-bridge synchronous rectifier.

In a further exemplary embodiment of any one of the apparatus above, the processing circuitry is also configured to determine the overlap duration based at least in part on an input voltage of the primary side of the full-bridge synchronous rectifier.

In an additional exemplary embodiment of any one of the apparatus above, the apparatus is embodied in an integrated circuit.

In a further exemplary embodiment of any one of the apparatus above, processing circuitry is a data processor, the receiving circuitry is a receiver, and the output circuitry is a transmitter.

An additional exemplary embodiment in accordance with this invention is a program storage device for providing synchronous rectifier gate drive timing to compensate for commutation time due to transformer leakage inductance. The program storage device is readable by a machine (for example, a computer) and is tangibly embodying a program of instructions executable by the machine for performing operations. The operations include receiving a first signal; generating a second signal by modifying the first signal to delay a transition from high to low for a non-zero overlap duration; and applying an inverse of the first signal as a gate drive timing of at least a first transistor, the first transistor is a part of a primary side of a full-bridge synchronous rectifier, applying the second signal as a gate drive timing of at least a second transistor, the second transistor is a part of a secondary side of the full-bridge synchronous rectifier. The second signal and the inverse of the first signal are high during the overlap duration.

In a further exemplary embodiment of the program storage device above, the operations also include: receiving a third signal; generating a fourth signal by modifying the third signal to delay a transition from high to low for the non-zero duration; applying an inverse of the third signal as a gate drive timing of at least a third transistor, the third transistor is a part of the primary side of the full-bridge synchronous rectifier, and applying the fourth signal as a gate drive timing of at least a fourth transistor, the fourth transistor is a part of the secondary side of the full-bridge synchronous rectifier. The fourth signal and the inverse of the third signal are high during the overlap duration.

In an additional exemplary embodiment of any one of the program storage devices above, the operations also include: applying the first signal as a gate drive timing of at least a fifth transistor, the fifth transistor is a part of the primary side of the full-bridge synchronous rectifier, and applying the third signal as a gate drive timing of at least a sixth transistor, the sixth transistor is a part of the primary side of the full-bridge synchronous rectifier.

In a further exemplary embodiment of any one of the program storage devices above, the operations also include: applying the second signal as a gate drive timing of at least a seventh transistor, the seventh transistor is a part of the secondary side of the full-bridge synchronous rectifier, and applying the fourth signal as a gate drive timing of at least an eighth transistor, the eighth transistor is a part of the secondary side of the full-bridge synchronous rectifier.

In an additional exemplary embodiment of any one of the program storage devices above, the operations also include determining the overlap duration based at least in part on an output current of the secondary side of the full-bridge synchronous rectifier.

In a further exemplary embodiment of any one of the program storage devices above, the operations also include determining the overlap duration based at least in part on an input voltage of the primary side of the full-bridge synchronous rectifier.

An additional exemplary embodiment in accordance with this invention is a method for providing synchronous rectifier gate drive timing to compensate for commutation time due to transformer leakage inductance. The method includes receiving a first signal and generating a second signal by modifying the first signal to delay a transition from high to low for a non-zero overlap duration. The method also includes applying an inverse of the first signal as a gate drive timing of at least a first transistor, the first transistor is a part of a primary side of a full-bridge synchronous rectifier, and applying the second signal as a gate drive timing of at least a second transistor, the second transistor is a part of a secondary side of the full-bridge synchronous rectifier. The second signal and the inverse of the first signal are high during the overlap duration.

In a further exemplary embodiment of the method above, the method also includes: receiving a third signal; generating a fourth signal by modifying the third signal to delay a transition from high to low for the non-zero duration; applying an inverse of the third signal as a gate drive timing of at least a third transistor, the third transistor is a part of the primary side of the full-bridge synchronous rectifier, and applying the fourth signal as a gate drive timing of at least a fourth transistor, the fourth transistor is a part of the secondary side of the full-bridge synchronous rectifier. The fourth signal and the inverse of the third signal are high during the overlap duration.

In an additional exemplary embodiment of any one of the methods above, the method also includes: applying the first signal as a gate drive timing of at least a fifth transistor, the fifth transistor is a part of the primary side of the full-bridge synchronous rectifier, and applying the third signal as a gate drive timing of at least a sixth transistor, the sixth transistor is a part of the primary side of the full-bridge synchronous rectifier.

In a further exemplary embodiment of any one of the methods above, the method includes applying the second signal as a gate drive timing of at least a seventh transistor, the seventh transistor is a part of the secondary side of the full-bridge synchronous rectifier, and applying the fourth signal as a gate drive timing of at least an eighth transistor, the eighth transistor is a part of the secondary side of the full-bridge synchronous rectifier.

In an additional exemplary embodiment of any one of the methods above, the method includes determining the overlap duration based at least in part on an output current of the secondary side of the full-bridge synchronous rectifier.

In a further exemplary embodiment of any one of the methods above, the method includes determining the overlap duration based at least in part on an input voltage of the primary side of the full-bridge synchronous rectifier.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying one or more of data processors that are configurable so as to operate in accordance with the exemplary embodiments of this invention.

Generally, various exemplary embodiments of the invention can be implemented in different mediums, such as software, hardware, logic, special purpose circuits or any combination thereof. As a non-limiting example, some aspects may be implemented in software which may be run on a computing device, while other aspects may be implemented in hardware.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications will still fall within the scope of the teachings of the exemplary embodiments of the invention.

Any use of the terms "connected", "coupled" or variants thereof should be interpreted to indicate any such connection or coupling, direct or indirect, between the identified elements. As a non-limiting example, one or more intermediate elements may be present between the "coupled" elements. The connection or coupling between the identified elements may be, as non-limiting examples, physical, electrical, magnetic, logical or any suitable combination thereof in accordance with the described exemplary embodiments. As non-limiting examples, the connection or coupling may comprise one or more printed electrical connections, wires, cables, mediums or any suitable combination thereof.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus comprising:
   receiving circuitry configured to receive a first signal;
   processing circuitry configured to generate a second signal by modifying the first signal to delay a transition from high to low for a non-zero overlap duration; and
   output circuitry configured:
   to apply an inverse of the first signal as a gate drive timing of at least a first transistor, the first transistor comprising a part of a primary side of a full-bridge synchronous rectifier and
   to apply the second signal as a gate drive timing of at least a second transistor, the second transistor comprising a part of a secondary side of the full-bridge synchronous rectifier,
   where the second signal and the inverse of the first signal are high during the overlap duration.

2. The apparatus of claim 1, where the receiving circuitry is further configured to receive a third signal;
   the processing circuitry is further configured to generate a fourth signal by modifying the third signal to delay a transition from high to low for the non-zero duration; and
   the output circuitry is further configured:
   to apply an inverse of the third signal as a gate drive timing of at least a third transistor, the third transistor comprising a part of the primary side of the full-bridge synchronous rectifier, and
   to apply the fourth signal as a gate drive timing of at least a fourth transistor, the fourth transistor comprising a part of the secondary side of the full-bridge synchronous rectifier,
   where the fourth signal and the inverse of the third signal are high during the overlap duration.

3. The apparatus of claim 2, where the output circuitry is further configured:
   to apply the first signal as a gate drive timing of at least a fifth transistor, the fifth transistor comprising a part of the primary side of the full-bridge synchronous rectifier.

4. The apparatus of claim 3, where the output circuitry is further configured:
   to apply the second signal as a gate drive timing of at least a seventh transistor, the seventh transistor comprising a part of the secondary side of the full-bridge synchronous rectifier, and
   to apply the fourth signal as a gate drive timing of at least an eighth transistor, the eighth transistor comprising a part of the secondary side of the full-bridge synchronous rectifier.

5. The apparatus of claim 1, where the processing circuitry is further configured to determine the overlap duration based at least in part on an output current of the secondary side of the full-bridge synchronous rectifier.

6. The apparatus of claim 1, where the processing circuitry is further configured to determine the overlap duration based at least in part on an input voltage of the primary side of the full-bridge synchronous rectifier.

7. The apparatus of claim 1, where the apparatus is embodied in an integrated circuit.

8. A program storage device readable by a machine, tangibly embodying a program of instructions executable by the machine for performing operations, said operations comprising:
   receiving a first signal;
   generating a second signal by modifying the first signal to delay a transition from high to low for a non-zero overlap duration;
   applying an inverse of the first signal as a gate drive timing of at least a first transistor, the first transistor comprising a part of a primary side of a full-bridge synchronous rectifier,
   applying the second signal as a gate drive timing of at least a second transistor, the second transistor comprising a part of a secondary side of the full-bridge synchronous rectifier, and
   where the second signal and the inverse of the first signal are high during the overlap duration.

9. The program storage device of claim 8, where the operations further comprise:
   receiving a third signal;
   generating a fourth signal by modifying the third signal to delay a transition from high to low for the non-zero duration;
   applying an inverse of the third signal as a gate drive timing of at least a third transistor, the third transistor comprising a part of the primary side of the full-bridge synchronous rectifier; and
   applying the fourth signal as a gate drive timing of at least a fourth transistor, the fourth transistor comprising a part of the secondary side of the full-bridge synchronous rectifier,
   where the fourth signal and the inverse of the third signal are high during the overlap duration.

10. The program storage device of claim 9, where the operations further comprise:
    applying the first signal as a gate drive timing of at least a fifth transistor, the fifth transistor comprising a part of the primary side of the full-bridge synchronous rectifier, and
    applying the third signal as a gate drive timing of at least a sixth transistor, the sixth transistor comprising a part of the primary side of the full-bridge synchronous rectifier.

11. The program storage device of claim 10, where the operations further comprise:
    applying the second signal as a gate drive timing of at least a seventh transistor, the seventh transistor comprising a part of the secondary side of the full-bridge synchronous rectifier, and
    applying the fourth signal as a gate drive timing of at least an eighth transistor, the eighth transistor comprising a part of the secondary side of the full-bridge synchronous rectifier.

12. The program storage device of claim 8, where the operations further comprise determining the overlap duration based at least in part on an output current of the secondary side of the full-bridge synchronous rectifier.

13. The program storage device of claim 8, where the operations further comprise determining the overlap duration based at least in part on an input voltage of the primary side of the full-bridge synchronous rectifier.

14. A method comprising:
    receiving a first signal;
    generating a second signal by modifying the first signal to delay a transition from high to low for a non-zero overlap duration;

applying an inverse of the first signal as a gate drive timing of at least a first transistor, the first transistor comprising a part of a primary side of a full-bridge synchronous rectifier; and applying the second signal as a gate drive timing of at least a second transistor, the second transistor comprising a part of a secondary side of the full-bridge synchronous rectifier, where the second signal and the inverse of the first signal are high during the overlap duration.

15. The method of claim 14, further comprising:

receiving a third signal;

generating a fourth signal by modifying the third signal to delay a transition from high to low for the non-zero duration;

applying an inverse of the third signal as a gate drive timing of at least a third transistor, the third transistor comprising a part of the primary side of the full-bridge synchronous rectifier; and applying the fourth signal as a gate drive timing of at least a fourth transistor, the fourth transistor comprising a part of the secondary side of the full-bridge synchronous rectifier, where the fourth signal and the inverse of the third signal are high during the overlap duration.

16. The method of claim 15, further comprising:

applying the first signal as a gate drive timing of at least a fifth transistor, the fifth transistor comprising a part of the primary side of the full-bridge synchronous rectifier, and applying the third signal as a gate drive timing of at least a sixth transistor, the sixth transistor comprising a part of the primary side of the full-bridge synchronous rectifier.

17. The method of claim 16, further comprising:

applying the second signal as a gate drive timing of at least a seventh transistor, the seventh transistor comprising a part of the secondary side of the full-bridge synchronous rectifier, and applying the fourth signal as a gate drive timing of at least an eighth transistor, the eighth transistor comprising a part of the secondary side of the full-bridge synchronous rectifier.

18. The method of claim 14, further comprising determining the overlap duration based at least in part on an output current of the secondary side of the full-bridge synchronous rectifier.

19. The method of claim 14, further comprising determining the overlap duration based at least in part on an input voltage of the primary side of the full-bridge synchronous rectifier.

* * * * *